United States Patent [19]
Bjorner et al.

[11] Patent Number: 5,912,447
[45] Date of Patent: Jun. 15, 1999

[54] CONCENTRIC OPTICAL PATH EQUALIZER WITH RADIALLY MOVING MIRRORS

[75] Inventors: Johannes A.S. Bjorner, Woodbury; Jaroslav Janik, Southbury, both of Conn.

[73] Assignee: United Parcel Service of America, Inc., Atlantic, Ga.

[21] Appl. No.: 08/783,511

[22] Filed: Jan. 14, 1997

[51] Int. Cl.$^6$ .................................................... G06K 7/10
[52] U.S. Cl. ...................... 235/454; 235/462.36; 359/862
[58] Field of Search ..................... 235/454, 462, 235/470, 462.36, 462.37, 462.38; 250/201.01, 201.6, 216, 201.1; 359/212, 223, 862

[56] References Cited

U.S. PATENT DOCUMENTS

| | | |
|---|---|---|
| 2,467,266 | 4/1949 | Lumsden . |
| 3,334,959 | 8/1967 | Walsh . |
| 3,381,569 | 5/1968 | Hatcher . |
| 3,617,105 | 11/1971 | Konrad ..................... 359/221 |
| 3,701,098 | 10/1972 | Acker ........................ 235/454 |
| 3,797,908 | 3/1974 | Ward et al. ............... 359/210 |
| 3,918,071 | 11/1975 | Albrecht ................... 396/101 |
| 4,100,412 | 7/1978 | Hausdorff ................. 250/343 |
| 4,136,821 | 1/1979 | Sugiura et al. ........... 235/462 |
| 4,268,165 | 5/1981 | Bradmon ................... 355/55 |
| 4,407,581 | 10/1983 | Shogren et al. .......... 399/206 |
| 4,547,068 | 10/1985 | Covey et al. ............. 356/244 |
| 4,564,271 | 1/1986 | Bernard et al. .......... 359/861 |
| 4,645,319 | 2/1987 | Fekete ....................... 353/31 |
| 4,843,228 | 6/1989 | Nakamura ............. 250/201.4 |
| 4,874,936 | 10/1989 | Chandler et al. ........ 235/494 |
| 4,877,949 | 10/1989 | Danielson et al. ...... 235/462 |
| 4,920,255 | 4/1990 | Gabeler .................... 235/454 |
| 5,049,797 | 9/1991 | Phillips ................... 318/568.16 |
| 5,064,259 | 11/1991 | Frank ....................... 359/212 |
| 5,117,256 | 5/1992 | Halbara ..................... 355/77 |
| 5,185,822 | 2/1993 | Miura ....................... 382/255 |
| 5,216,230 | 6/1993 | Nakazawa ................ 235/462 |
| 5,308,966 | 5/1994 | Danielson et al. ...... 235/472 |
| 5,471,264 | 11/1995 | Hsia et al. ............... 359/862 |
| 5,485,263 | 1/1996 | Bjorner et al. .......... 356/4.01 |
| 5,616,909 | 4/1997 | Arackellian ............. 235/472 |

FOREIGN PATENT DOCUMENTS

| | | |
|---|---|---|
| 0 267 549 | 5/1988 | European Pat. Off. . |
| 0 494 647 A2 | 7/1992 | European Pat. Off. . |
| 0 494 647 A3 | 7/1992 | European Pat. Off. . |
| PCT/US91/ 09522 | 7/1992 | WIPO . |

*Primary Examiner*—Donald Hajec
*Assistant Examiner*—Drew A. Dunn
*Attorney, Agent, or Firm*—Jones & Askew, LLP

[57] ABSTRACT

The optical path between a camera positioned above a conveyor and objects traveling on the conveyor is adjusted by moving a plurality of mirrors that at least partially define the optical path. The mirrors are manipulated as a function of the height of the objects so that the length of the optical path between each object and the camera is generally the same. The plurality of movable mirrors are equidistant from and arranged about a central point. The plurality of movable mirrors are contemporaneously moved toward and away from the central point to equalize the length of the optical path. Each of the movable mirrors translates along a different travel path. The travel paths are non-parallel. The plurality of movable mirrors are arranged so that the optical path includes a plurality of segments, and at least one intersection is defined between the segments distant from the movable mirrors.

48 Claims, 5 Drawing Sheets

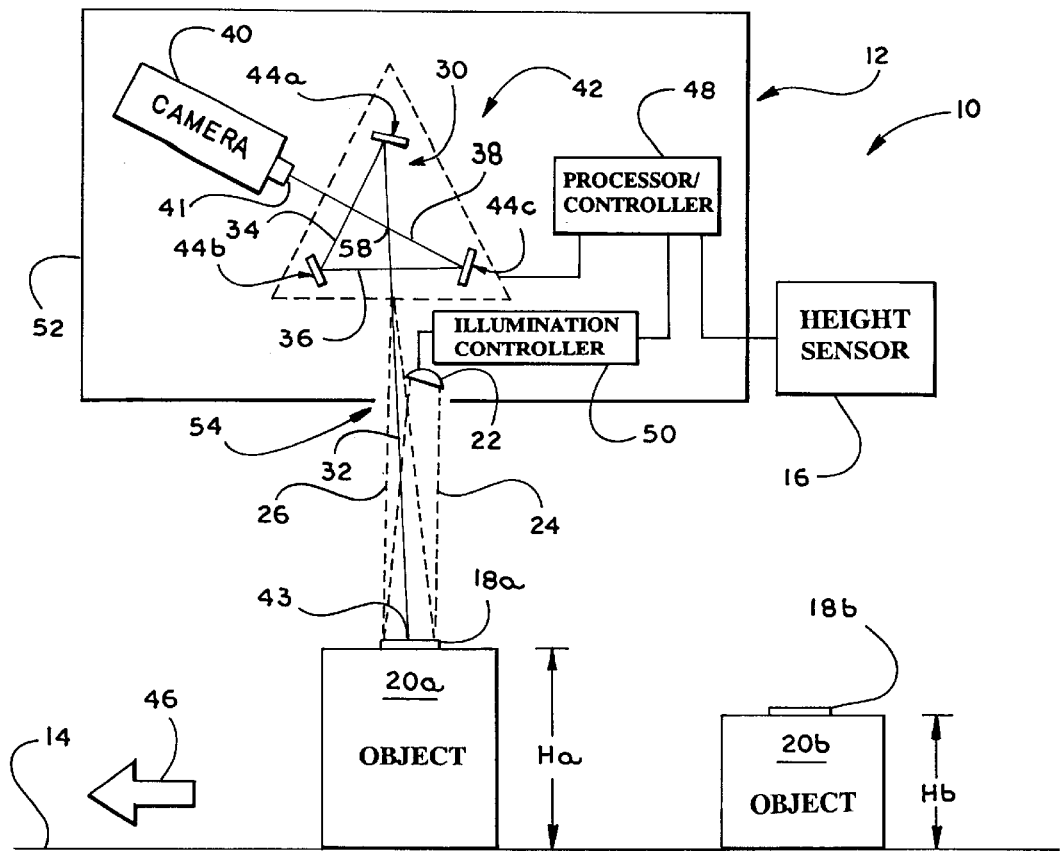
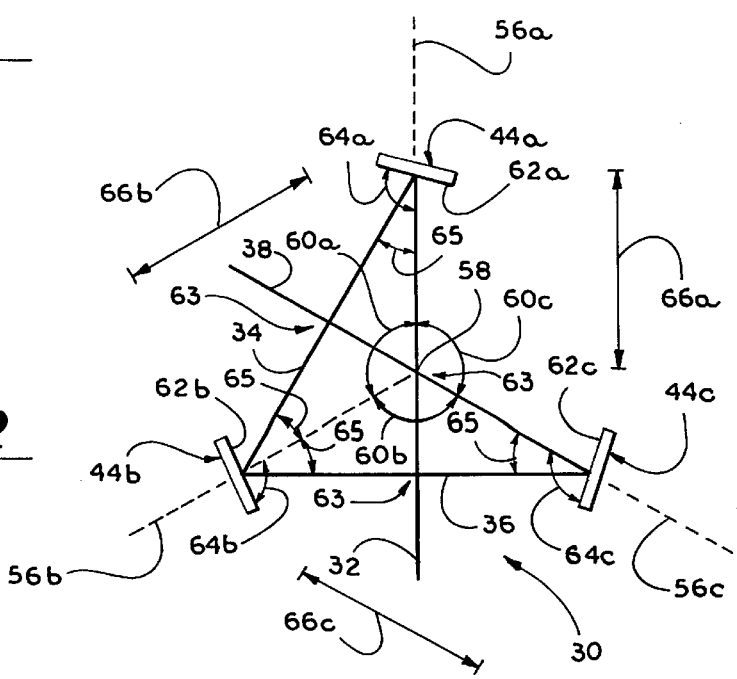

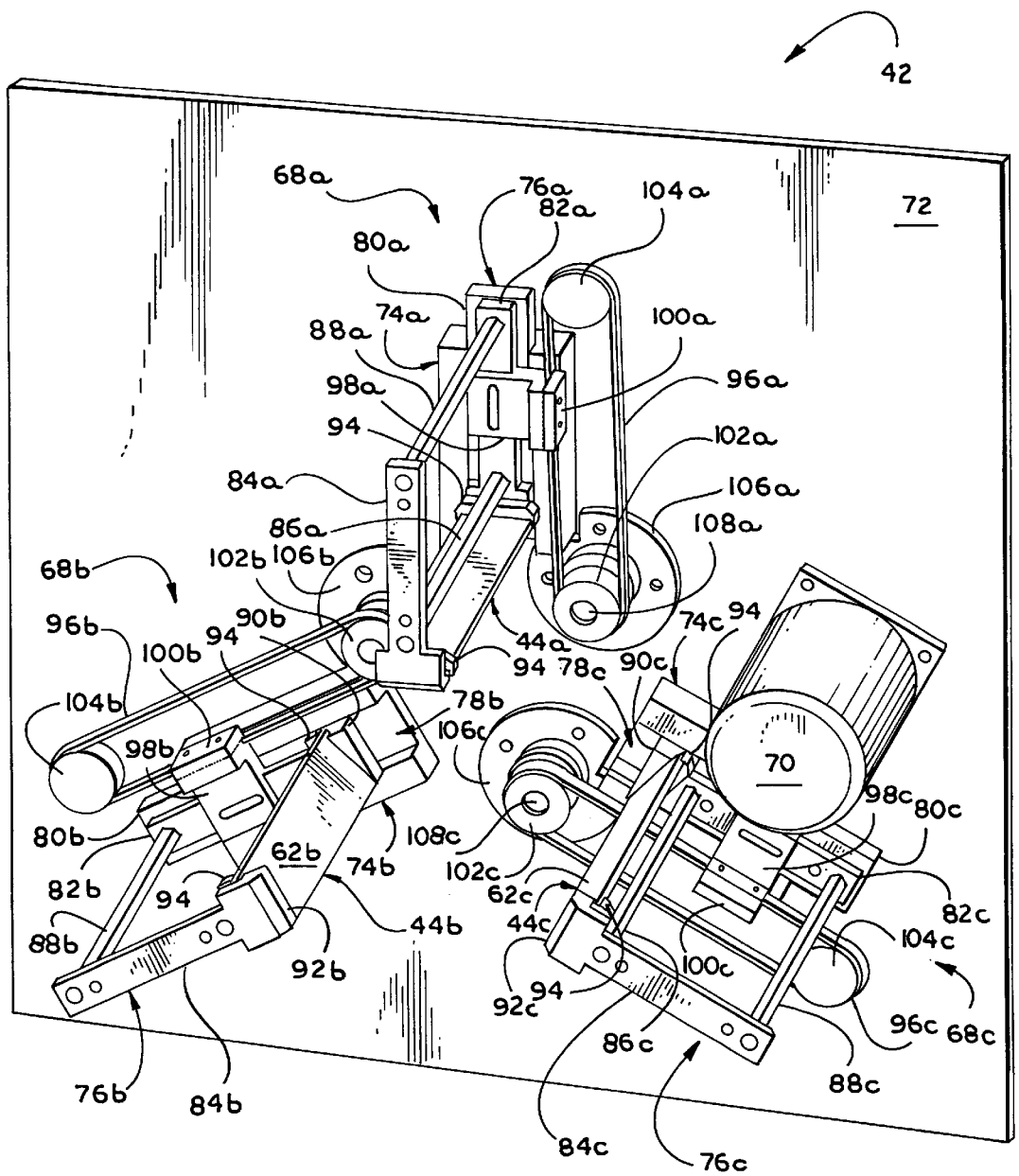
Fig_3

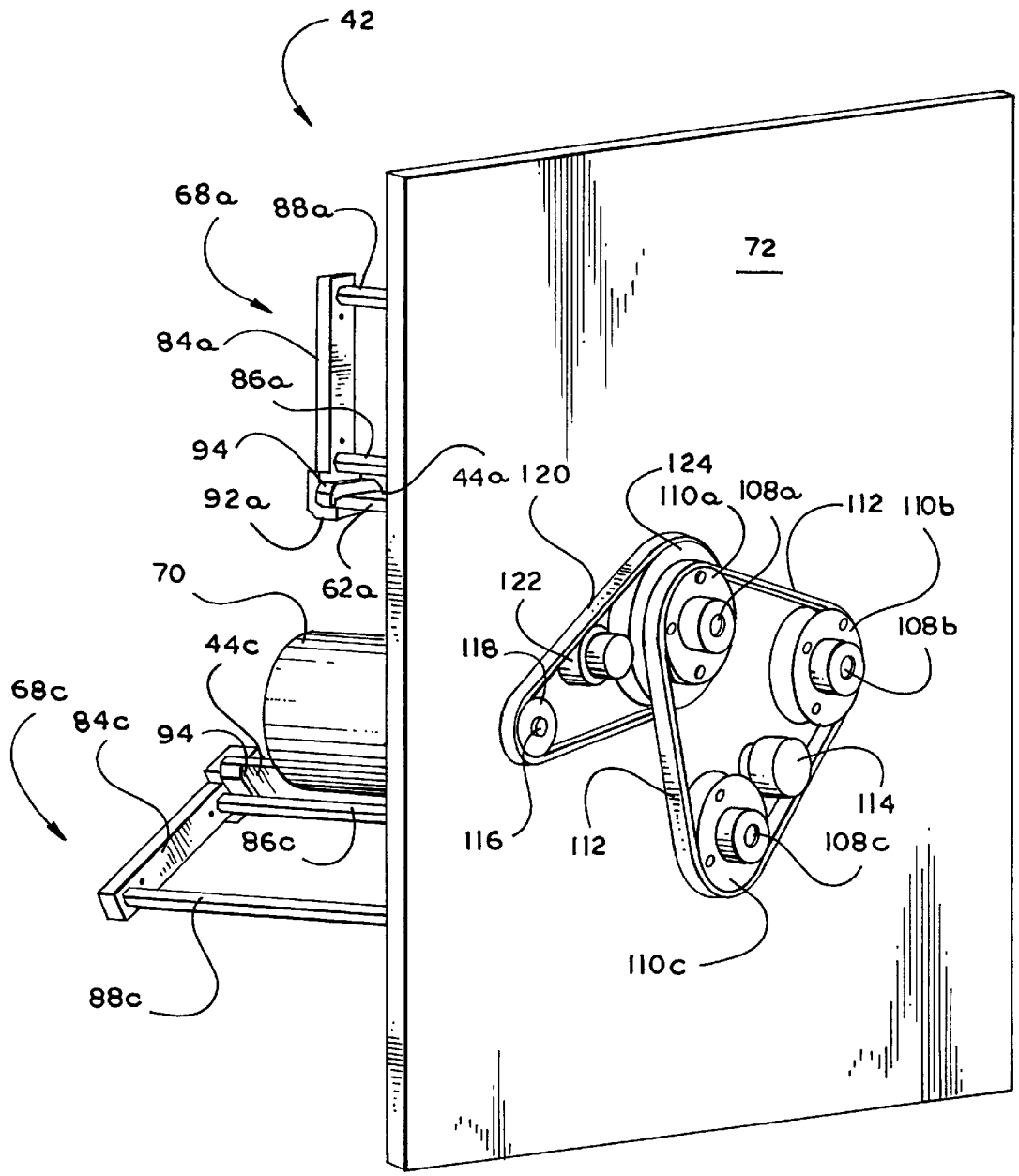
Fig_5

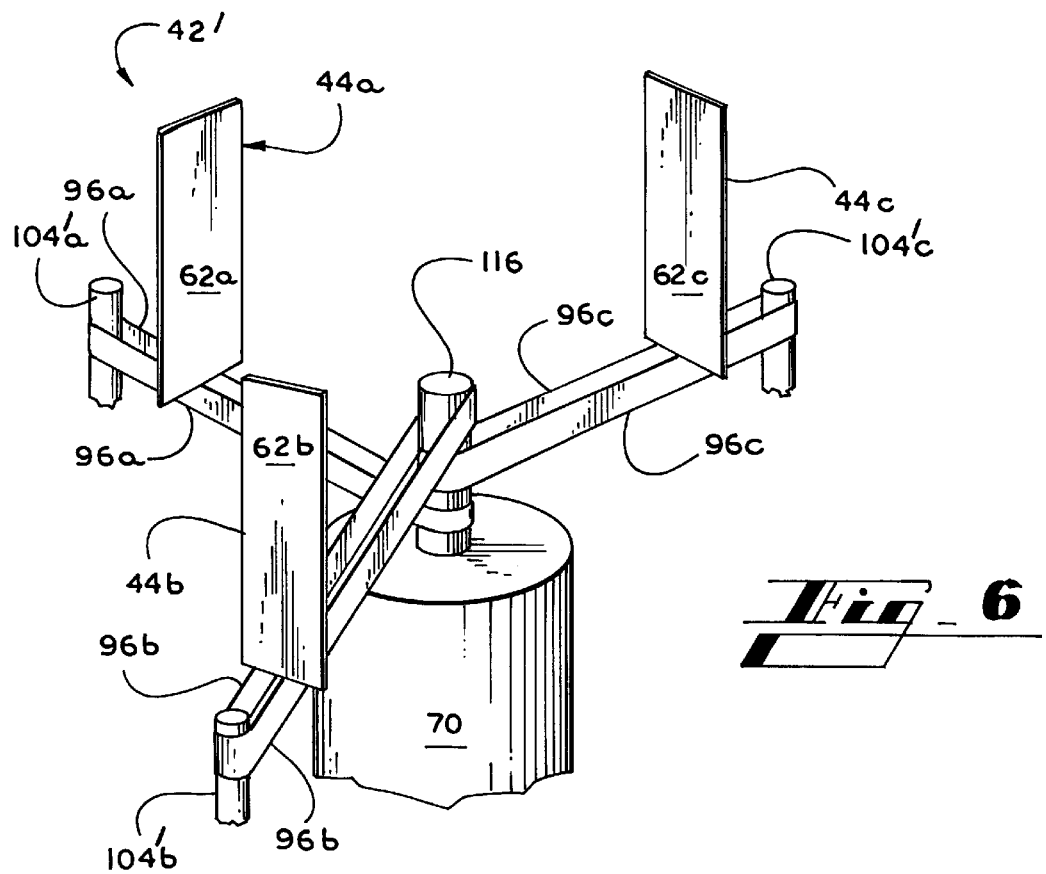
*Fig_6*
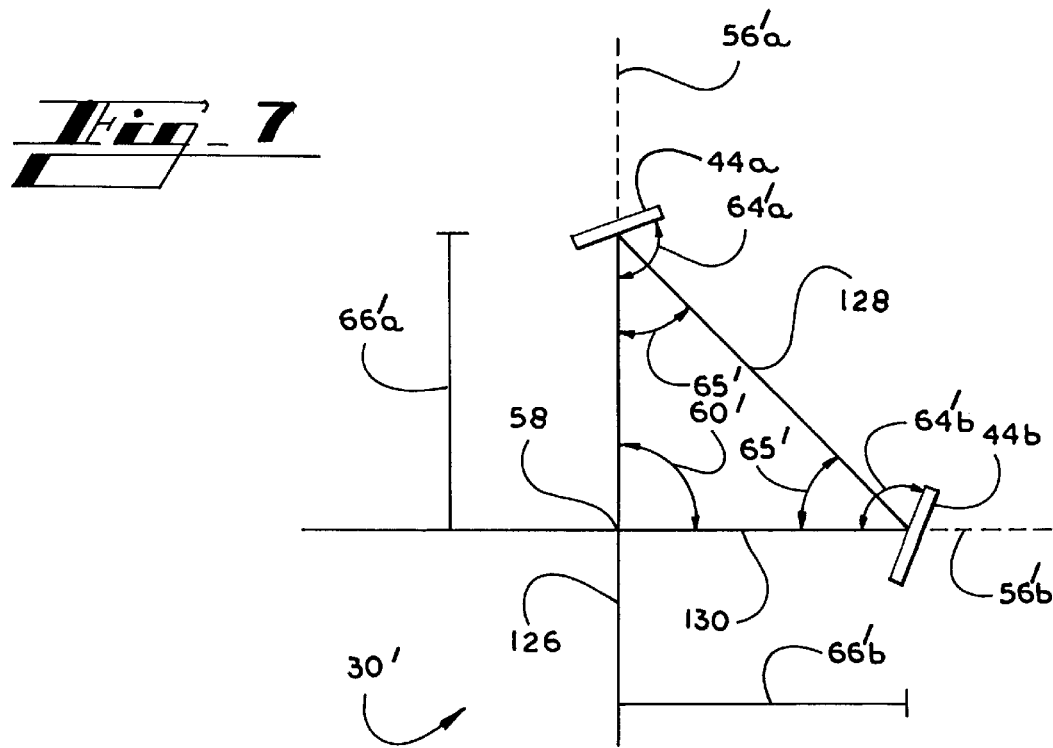
*Fig_7*

CONCENTRIC OPTICAL PATH EQUALIZER WITH RADIALLY MOVING MIRRORS

TECHNICAL FIELD

The present invention relates generally to optical systems, and in particular to an optical system for equalizing the length of an optical path defined between a camera and objects traveling below the camera on a conveyor belt.

BACKGROUND OF THE INVENTION

In recent years, the use of camera systems or code readers which are adapted to optically read labels containing alpha-numeric or encoded information, such as bar codes or the like, has become widespread. The growth in the use of such camera systems or code readers has been particularly strong in the parcel delivery industry, where information is printed on optically-readable labels affixed to packages being shipped or transported. One example of a modern optically-readable label is described in U.S. Pat. No. 4,874,936, which is incorporated herein by reference.

In order to optically read labels in an automated fashion, the parcel delivery industry commonly uses "over the belt" camera systems. In such systems an overhead camera captures images of labels on packages traveling on a conveyor belt below the overhead camera. Typically these camera systems utilize charge-coupled device ("CCD") cameras. Modem over the belt camera systems are typically used with conveyor systems having belt widths of up to five feet to accommodate packages of varying sizes and shapes, and belt speeds of up to five hundred feet per minute.

Over the belt camera systems pose focusing challenges for their cameras. In order to capture and create images of labels containing alpha-numeric or encoded information, overhead camera systems must be able to focus on the labels as they rapidly pass on the conveyor belt. Packages traveling below an overhead camera often have varying heights, so the distance between the overhead camera and labels on the packages will change significantly. Often the height of the packages will vary to such an extent that some labels fall outside of the depth of field of the overhead camera, thereby preventing the overhead camera from adequately focusing on those labels.

Over the belt camera systems can also experience distortion problems. It is typical for an overhead camera to take "slices" of the image of a label as it passes below the camera. The width of each slice is determined by the field of view across the conveyor belt, and the length of each slice is determined by the velocity of the belt. The "aspect ratio" is defined as the ratio of the length of a slice to the width of a slice. It is important to keep the aspect ratio constant to prevent images from becoming distorted. In the parcel delivery industry, it is common for packages traveling on conveyor belts below overhead cameras to be of varying heights. Overhead cameras typically have a different field of view at different heights (i.e., at different optical path lengths). As a result, the "aspect ratio" varies between packages causing the images created by the overhead camera to become distorted.

It is common to avoid certain focusing and distortion problems in an over the belt camera system by adjusting the optical path defined between the overhead camera of the system and the packages passing under the camera. The optical path is adjusted so that the length of the optical path defined between the camera and each package is approximately the same (i.e., the length of the optical path is equalized). U.S. Pat. No. 5,185,822 discloses such an over the belt camera system, wherein a movable pair of mirrors 31, 32 move relative to and are interposed between an overhead camera 20 and a stationary mirror 6. The movable pair of mirrors face each other at an angle of 90 degrees and do not move relative to one another. The stationary mirror reflects an image of an object carried by the conveyor to a first mirror 31 of the movable pair of mirrors. The first mirror of the movable pair of mirrors reflects the image of the object to a second mirror 32 of the movable pair of mirrors. The second mirror of the movable pair of mirrors reflects the image of the object to the overhead camera.

While the over the belt camera system of U.S. Pat. No. 5,185,822 functions to equalize the length of the optical path defined between the camera and packages of varying heights, that system can also be described in the context of changing the length of the optical path defined between the camera 20 and a single, stationary object, such as a package. In that context, the movable pair of mirrors 31, 32 are together moved away from the stationary mirror 6 and the camera to increase the length of the optical path defined between the camera and the object. Also, the movable pair of mirrors are together moved toward the stationary mirror and the camera to decrease the length of the optical path defined between the camera and the object. The resulting changes in the optical path length are equal to twice the change in the distance between the stationary mirror and the movable pair of mirrors. Therefore, to substantially increase the optical path length, it is necessary to substantially increase the distance between the stationary mirror and the pair of movable mirrors and/or increase the number of mirrors interposed in the optical path. Increasing the number of mirrors increases the complexity of the system, and either option for increasing the optical path length consumes additional space.

U.S. Pat. No. 5,485,263 discloses another over the belt camera system, which includes an array of stationary mirrors 70 and a movable pair of mirrors 60, 80, for equalizing the optical path length defined between an overhead camera 20 and objects carried under the camera by a conveyor. The movable pair of mirrors move relative to one another and relative to the stationary array of mirrors. The movable pair of mirrors are each individually moved such that they together cooperate with a selected mirror of the stationary array of mirrors. Each mirror of the stationary array of mirrors is at a different distance from the movable pair of mirrors.

While the over the belt camera system of U.S. Pat. No. 5,485,263 functions to equalize the length of the optical path defined between the camera 20 and packages of varying heights, that system can also be described in the context of changing the optical path length between the camera and a single, stationary object, such as a package. Each mirror of the stationary array of mirrors 70 is at a different distance from the movable pair of mirrors 60, 80 and cooperates with the movable pair of mirrors to define a different optical path length. A first mirror 60 of the movable pair of mirrors directly receives an image from the object. That first mirror of the movable pair of mirrors reflects the image of the object to a first selected mirror of the stationary array of mirrors. The first selected mirror of the stationary array of mirrors reflects the image of the object to a second mirror 80 of the movable pair of mirrors. The second mirror of the movable pair of mirrors reflects the image to the camera. The optical path length is changed by selecting and having the movable pair of mirrors cooperate with a second mirror the stationary array of mirrors. The change in the optical path length is equal to twice the distance between the first and second selected mirrors of the array of stationary mirrors. To substantially increase the optical path length, it is necessary to substantially increase the distance between mirrors and/or increase the number of mirrors interposed in the optical path. Having additional mirrors interposed in the optical path increases the complexity of the system, and either option for increasing the optical path length consumes additional space.

In summary, prior optical path equalizers require numerous mirrors in the optical path and/or substantial distances between mirrors to compensate for substantial variations in package heights. Having numerous mirrors interposed in the optical path detrimentally increases the complexity and size of optical path equalizers. Having substantial distances between mirrors of optical path equalizers also detrimentally increases the size of optical path equalizers.

There is therefore a need for an optical path equalizer that can compensate for substantial variations in package heights while occupying a small space and not requiring an excessive number of mirrors.

SUMMARY OF THE INVENTION

In accordance with an exemplary embodiment, the present invention provides an improved optical path equalizer that compensates for substantial variations in package heights while occupying a small space and not requiring an excessive number of mirrors. The optical path equalizer of the present invention is in the form of an optics assembly that includes a plurality of movable mirrors that cooperate to at least partially define an optical path. The plurality of movable mirrors are contemporaneously moved toward and away from a central point to equalize the optical path length defined between a camera and sequentially encountered objects of varying heights.

While the present invention preferably functions to equalize the optical path length defined between a camera and sequentially encountered objects of varying heights, the present invention can also be described in the context of changing the optical path length between the camera and a single, stationary object. In that context, the plurality of movable mirrors are contemporaneously moved toward the central point to decrease the length of the optical path, and contemporaneously moved away from the central point to increase the length of the optical path. Therefore, the present invention provides for substantial adjustments to the length of an optical path while occupying a small space and not requiring an excessive number of mirrors.

More particularly, in accordance with the exemplary embodiment of the present invention, the plurality of movable mirrors are equidistant from the central point. Each of the movable mirrors translates along a different travel path to adjust the optical path, and the travel paths are non-parallel. The plurality of movable mirrors are arranged so that the optical path includes a plurality of segments, and at least one intersection that is distant from each mirror of the plurality of movable mirrors is defined between segments of the plurality of segments.

In accordance with the exemplary embodiment of the present invention, the optics assembly (i.e., optical path equalizer) is incorporated into an over the belt camera system that includes an overhead camera that captures images of labels on packages traveling on a conveyor below the camera. The optics assembly at least partially defines and adjusts the optical path between the overhead camera and the labels. Each movable mirror of the plurality of movable mirrors is mounted to a carriage that travels upon a track. The carriages are automatically translated toward and away from the central point in response to measurements from a height sensor that relate to heights of the packages. The carriages are translated so that the length of the optical path defined between the camera and each package is generally the same.

In accordance with the exemplary embodiment of the present invention, the carriages are moved by a motor. Motor movement is transmitted to the carriages by way of a transmission system. The transmission system controls the movement of the carriages so that they are contemporaneously moved toward and away from the central point. In the exemplary embodiment, the transmission system includes a plurality of belts and pulleys that are arranged such that the plurality of movable mirrors are moved toward the central point when the shaft of the motor is rotated in one direction, and away from the central point when the shaft of the motor is rotated in the opposite direction.

Therefore, it is an object of the present invention to provide an improved optical path equalizer.

Another object of the present invention is to provide a compact and efficient arrangement of mirrors in an optical path equalizer.

Still another object of the present invention is to provide for substantial adjustments to an optical path while occupying a relatively small space.

Still another object of the present invention is to provide for large adjustments to an optical path with relatively small changes in mirror positions.

Still another object of the present invention is to provide for large adjustments to an optical path with relatively few mirrors.

Still another object of the present invention is to capture generally focused and undistorted images of information-encoded labels that are attached to and traveling with packages of varying heights.

Still another object of the present invention is to enhance package handling operations in the parcel delivery industry.

Other objects, features, and advantageous of the present invention will become apparent upon review of the following description of embodiments and the appended drawings and claims.

BRIEF DESCRIPTION OF THE DRAWINGS

FIG. 1 is a schematic diagram of an over the belt camera system in accordance with an exemplary embodiment of the present invention.

FIG. 2 is a schematic diagram of an optics assembly of the camera system of FIG. 1.

FIGS. 3–4 are isolated, front pictorial views of the optics assembly of FIG. 1.

FIG. 5 is an isolated, rear pictorial view of the optics assembly of FIG. 1.

FIG. 6 is a partially cut-away, schematic view of an optics assembly in accordance with a first alternate embodiment of the present invention.

FIG. 7 is a schematic diagram of an optics assembly in accordance with a second alternate embodiment of the present invention.

DETAILED DESCRIPTION OF THE INVENTION

Figure 4:
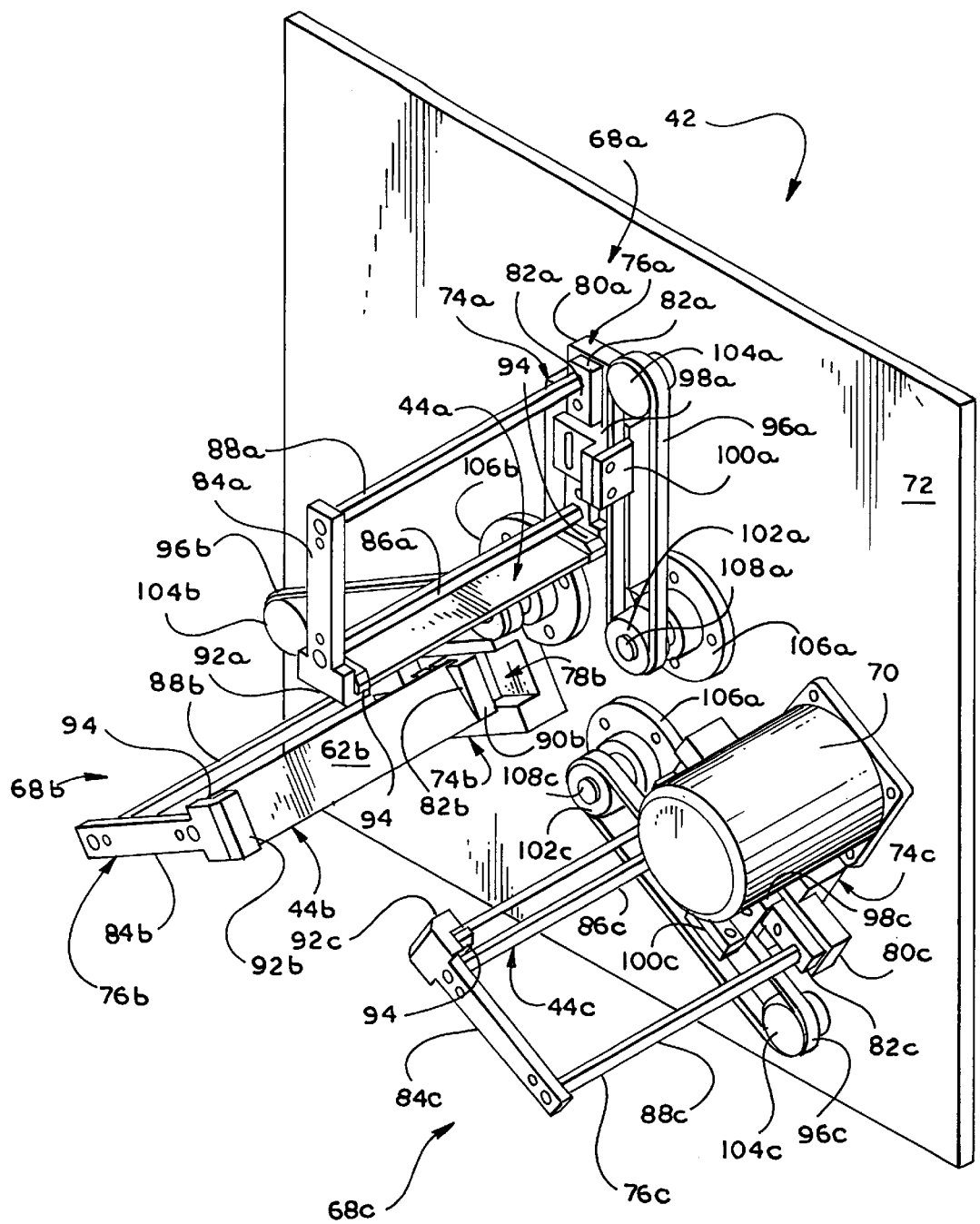

Turning now to the drawings in which like numbers reference like parts in the several figures, FIG. 1 is a schematic view of an over the belt camera system 10 in accordance with an exemplary embodiment of the present invention. The camera system 10 includes an optical system 12 disposed above a conveyor belt 14 and cooperating with a height sensor 16 to capture generally focused and undistorted images of objects. In accordance with the exemplary embodiment, the objects are information-encoded labels 18 on packages 20 traveling on the conveyor belt 14. The optical system 12 includes a light source 22 that directs a light beam 24 to a label 18a. A light beam 26 is reflected off of the label 18a and directed by an optics assembly 42 (i.e., an optical path equalizer) to a detector 40 (e.g., a charge-coupled device camera). The optics assembly 42 houses a plurality of movable mirrors 44a–c that are concentrically arranged and cooperate to at least partially define an optical path 30. The light beam 26 is reflected by the mirrors 44a–c and follows the optical path 30 defined thereby to convey the image of the label 18a to the detector 40. The mirrors 44a–c are contemporaneously moved toward and away from a point 58 that is central to the mirrors 44a–c to equalize the length of the optical path 30.

As depicted in FIG. 1, a plurality of objects or packages 20 move in the direction defined by the arrow 46 under the optical system 12. Therefore, the detector 40 views packages 20 in succession. The present invention equalizes the length of the optical path 30 when packages 20 of different height "H" pass under the optical system 12. That is, in accordance with the exemplary embodiment of the present invention, the optics assembly 42 adjusts the optical path 30 so that the length the optical path 30 defined with respect to the package 20a will be generally identical to the length of the optical path 30 defined with respect to the package 20b, irrespective of the height difference between the package 20a and the package 20b. This seeks to allow the detector 40 to capture focused and undistorted images of labels 18.

The optical path 30 includes a plurality of segments. A first (e.g., final) segment 32 extends to the mirror 44a, and is depicted in FIG. 1 as extending between the label 18a and the mirror 44a. A second segment 34 extends between the mirror 44a and the mirror 44b, and a third segment 36 extends between the mirror 44b and the mirror 44c. A fourth segment 38 extends away from the mirror 44c, and is depicted in FIG. 1 as extending between the mirror 44c and the detector 40. While the optical path 30 is the path that light generated from the light source 22 and reflected by a label 18 follows, the optical path 30 exists irrespective of the light source 22, the detector 40, and an object to be viewed by the detector 40. The mirrors 44a–c are arranged so that the optical path 30 is continuously defined during all movements of the mirrors 44a–c.

As depicted in FIG. 1, the optical path 30 includes a first end 41 at the detector 40 and a second end 43 at the package 20a. As also depicted in FIG. 1, the first segment 32 defines a vertical axis. The second end 43 travels along that vertical axis in response to variations in package 20 heights. As depicted in FIG. 1, since the package 20a is aligned with the axis of the first segment 32, the second end 43 of the optical path 30 is at a first height (i.e., position) "Ha" above the conveyor belt 14. However, when the package 20a is conveyed away from the axis of the first segment 32 and the package 20b is conveyed so that it is aligned with that axis, the second end 43 of the optical path 30 is at a second height (i.e., position) "Hb" above the conveyor belt 14. The optical assembly 42 functions to equalize the length of the optical path 30 when the second end 43 of the optical path 30 is changed from the first height "Ha" to the second height "Hb" by concentrically and contemporaneously moving the mirrors 44a–c toward the central point 58. Conversely, in a situation in which the package 20b precedes the package 20a, the optical assembly 42 functions to equalize the length of the optical path 30 when the second end 43 of the optical path 30 is changed from the height "Hb" to the height "Ha" by concentrically and contemporaneously moving the mirrors 44a–c away from the central point 58.

Since the length of the optical path 30 preferably remains generally constant irrespective of the height of the package 20 being viewed by the optical system 12, the optical path 30 can be considered to be analogous to a tensioned, unstretchable string of constant length. In this analogy, one end of the string is connected to the detector 40 and the opposite end of the string contacts one of the packages 20. Accordingly, when the detector 40 is viewing the package 20a, the optics assembly 42 functions to accumulate excess string, and when the detector 40 is viewing the package 20b, the optics assembly 42 functions to release at least some of the accumulated string.

The movement of the mirrors 44a–c is controlled by a processor 48 that cooperates with the height sensor 16 which measures the height of the packages 20 as they pass under the optical system 12. The processor 48 is responsive to the height sensor 16 and at least partially facilitates movement of the mirrors 44a–c to equalize the length of the optical path 30 when packages 20 of different height pass under the optical system 12. The processor 48 further controls an illumination controller 50 that controls the light source 22. The optical system 12 further includes a housing 52 that defines an aperture 54 therethrough. The light beams 24, 26 pass through the aperture 54. The height sensor 16, light source 22, detector 40, processor 48, and illumination controller 50 are all disclosed in U.S. Pat. No. 5,485,263, which is expressly incorporated by reference, in its entirety.

While the present invention preferably functions to equalize the length of the optical path 30 when packages 20 of different height pass under the optical system 12, the present invention can also be described in the context of changing the length of an optical path 30 defined between the detector and a single, stationary package 20. In that context, the optical assembly 42 decreases the length of the optical path 30 by concentrically and contemporaneously moving the mirrors 44a–c toward the central point 58. Conversely, the optical assembly 42 increases the length of the optical path 30 by concentrically and contemporaneously moving the mirrors 44a–c away from a central point 58. Similarly, if the optical path 30 were defined to be the optical path segment extending between the detector 40 and the aperture 54 in the housing 52, then the length of the so defined optical path segment 30 would vary in response to the concentric and contemporaneous movement of the mirrors 44a–c relative to the central point 58.

FIG. 2 is a schematic diagram of the mirrors 44a–c of the optics assembly 42 (FIG. 1). The construction of each of the mirrors 44a–c is generally identical. Therefore, throughout the following discussion, reference to a mirror 44 should be understood to be a reference to each of the mirrors 44a–c, unless expressly indicated otherwise. As discussed in greater detail below, each mirror 44 is restricted to translational movement along a different travel path 56. Translational movement means that for a single mirror 44, every point of that single mirror 44 moves parallel to, and the same distance as, every other point of that single mirror 44 (i.e., nonrotational displacement). Each of the travel paths 56a–c is straight, and the travel paths 56 extend radially from the central point 58. The mirrors 44 are concentrically arranged about the central point 58. Path angles 60 are defined between the travel paths 56. In accordance with the exemplary embodiment, each path angle 60 is approximately one hundred and twenty degrees. Reflection angles 65 are defined between the segments 32, 34, 36 and 38 and the travel paths 56. In accordance with the exemplary embodiment, each reflection angle 65 is approximately 30 degrees. The mirrors 44 are also arranged such that the travel path 56a is collinear with the first segment 32 of the optical path 30, and the travel path 56c is collinear with the fourth segment 38 of the optical path 30.

Each mirror 44 includes a generally planar reflective surface 62 that faces generally toward the central point 58. For each mirror 44, an orientation angle 64 is defined between its reflective surface 62 and its travel path 56. In accordance with the exemplary embodiment, the orientation angle 64a is approximately 105 degrees, the orientation angle 64b is approximately 90 degrees, and the orientation angle 64c is approximately 105 degrees. The mirrors 44 are arranged so that the first segment 32 of the optical path 30 extends between the label 18 (FIG. 1) being imaged by the optical system 12 (FIG. 1) and a central point on the reflective surface 62a of the mirror 44a. The second segment 34 of the optical path 30 extends between the central point on the reflective surface 62a of the mirror 44a and a central point on the reflective surface 62b of the mirror 44b. The third segment 36 of the optical path 30 extends between the central point on the reflective surface 62b of the mirror 44b and a central point on the reflective surface 62c of the mirror 44c. The fourth segment 38 of the optical path 30 extends between the central point on the reflective surface 62c of the mirror 44c and the detector 40 (FIG. 1). The travel paths 56 and segments 32, 34, 36 and 38 of the optical path 30 extend in a common plane. Therefore, the segments 32, 34, 36 and 38 of the optical path 30 intersect to define three intersections 63 that are displaced from the mirrors 44.

The central point on the reflective surface 62 of each mirror 44 is a separation distance 66 from the central point 58. In accordance with the exemplary embodiment of the present invention, the separation distances 66a–c are always equal, and are adjusted to equalize the length of the optical path 30 in order to compensate for different package 20 heights. Referring also to FIG. 1, the processor 48 functions to change the separation distances 66 in response to height measurements made by the height sensor 16 so that the length of the optical path 30 remains generally constant irrespective of the height of the package 20 being viewed by the optical system 12. For example, the separation distances 66 would be equal to a first value when the optical system 12 is viewing the package 20a, and a second value when the optical system 12 is viewing the package 20b which is not as high as the package 20a. The second value would be smaller than the first value so that the length of the optical path 30 for the package 20a is generally equal to the length of the optical path 30 for the package 20b.

While the present invention preferably functions to equalize the length of the optical path 30 when packages 20 of different heights pass under the optical system 12, as mentioned above, the present invention can also be described in the context of changing the length of the optical path 30. In that context, the separation distances 66a–c are increased to increase the length of the optical path 30 and decreased to decrease the length of the optical path 30. A large adjustment to the length of the optical path 30 is achieved with a relatively small change in the separation distances 66. For example, when the mirrors 44 are arranged as depicted and described with respect to FIG. 2, the change in the length of the optical path 30 is equal to approximately 5.4641 times the change in the separation distance 66. Therefore, if the separation distances 66a–c are each increased by 4 inches, the length of the optical path 30 is increased by approximately 21.8564 inches.

FIGS. 3 and 4 are front pictorial views of the optics assembly 42, in accordance with the exemplary embodiment of the present invention. Each mirror 44a–c is mounted within a mirror assembly 68a–c, respectively. The mirror assemblies 68 and a motor 70 that moves the mirrors 44a–c are mounted to a support frame (e.g., base plate 72) that serves as a frame of reference. Each of the mirror assemblies 68a–c are generally identical. Therefore, throughout the following discussion, reference to a mirror assembly 68 or the components thereof should be understood to be representative of each of the mirror assemblies 68a–c and the components thereof, unless expressly stated otherwise. Each mirror assembly 68 includes a track 74 that is immovably mounted to the base plate 72. A separate carriage 76 travels on each track 74. Each track 74 is generally U-shaped in an end profile view thereof such that it defines an elongated channel 78 that defines the travel path 56 (FIG. 2) of its respective carriage 76. Each channel 78 is generally rectangular in an end view thereof. Each carriage 76 includes a slide block 80 that has generally rectangular cross-sections and slides within its respective channel 78 to provide the changes in separation distances 66 (FIG. 2) discussed above. Each slide block 80 and its respective track 74 are preferably components of a conventional linear ball slide assembly that includes internal stops that prevent separation of the slide block 80 from the track 74.

A lower mirror mount 82 is mounted to and travels with the upper surface of each slide block 80. Inner connecting rods 86 and an outer connecting rods 88 connect an upper mirror mount 84 to each lower mirror mount 82. Each lower mirror mount 82 includes a lower angled lip 90 extending away from its respective slide block 80, and each upper mirror mount 84 includes an upper angled lip 92 extending toward its respective slide block 80. The opposite ends of each mirror 44 are secured between a lower angled lip 90, an upper angled lip 92 and cooperating brackets 94. That is, the upper edge of each mirror 44 is sandwiched between an upper angled lip 92 and a bracket 94, and the lower edge of each mirror 44 is sandwiched between a lower angled lip 90 and a bracket 94.

Each mirror assembly 68 further includes a continuous flexible drive belt 96. Each mirror assembly 68 further includes an L-shaped bracket 98 that is securely mounted to its respective lower mirror mount 82 and fitted with a bracket plate 100. A segment of each drive belt 96 is immovably sandwiched and connected between its respective L-shaped bracket 98 and bracket plate 100 such that movement of the drive belts 96 causes the carriages 76 to move. Each drive belt 96 extends around a drive pulley 102 and an idler pulley 104. Each mirror assembly 68 further includes a shaft mount 106 that is mounted to the base plate 72. Each mirror assembly 68 additionally includes a drive shaft 108, which extends through the base plate 72 and the respective shaft mount 106, for driving the respective drive pulley 102.

FIG. 5 is an isolated, rear pictorial view of the optical assembly 42, in accordance with the exemplary embodiment of the present invention. Each of the drive shafts 108 extend through the base plate 72. A drive pulley 110 is mounted to each drive shaft 108. A single continuous flexible drive belt 112 extends around the drive pulleys 110 and an idler pulley 114. The output shaft 116 of the motor extends through the base plate 72 and its mounted to a drive pulley 118. A continuous flexible drive belt 120 extends around the drive pulley 118, an idler pulley 122, and a drive pulley 124 which is concentrically mounted to the drive pulley 110a in a manner such that the drive shafts 108 rotate slower than the motor shaft 116. In accordance with the exemplary embodiment of the present invention, rotation of the motor shaft 116 causes rotation of the drive shafts 108 such that each of the mirrors 44 move toward and away from the central point 58 (FIG. 2) at an equal speed and the separation distances 66a–b (FIG. 2) remain equal. The processor 40 (FIG. 1) controls the operation of the motor 70 in response measurements made by the height sensor 16 (FIG. 1).

Referring to FIGS. 3–5, the pulleys 102, 104, 110, 114, 118, 122, 124; drive belts 96, 112, 120; shaft mounts 106; and drive shafts 108 can all be characterized as being part of an exemplary transmission system. In accordance with alternate embodiments of the present invention, the optics assembly 42 includes various alternate transmission systems that are capable of providing the above-described controlled movement of the mirrors 44. For example, in accordance with one alternate embodiment, the transmission system includes a plurality of worm gears.

FIG. 6. is a partially cut-away, schematic view of an optics assembly 42' in accordance with a first alternate embodiment of the present invention. The alternate optics assembly 42' is generally identical to the optics assembly 42 (FIGS. 1 and 3–5) of the exemplary embodiment, except for the changes noted herein and the changes that would be understood by one reasonably skilled in the art in light of this disclosure. In accordance with the first alternate embodiment, the drive belts 96 are more directly driven by the motor shaft 116 such that certain components of the transmission system of the exemplary embodiment of FIGS. 1–5 are not required. However, in accordance with the first alternate embodiment of the present invention, pulleys can be used to modify the rotational ratio between the motor shaft 116 and the drive belts 96 to modify the speed of the mirrors 44 relative to the speed of the motor shaft 116.

FIG. 7. is a schematic diagram of an optics assembly that includes only two movable mirrors 44, in accordance with a second alternate embodiment of the present invention. The optics assembly of the second alternate embodiment can be used in place of the optics assembly 42 (FIGS. 1 and 3–5) in the camera system 10 (FIG. 1) of the exemplary embodiment. The optics assembly of the second alternate embodiment is generally identical to the optics assembly 42 (FIGS. 1 and 3–5) of the exemplary embodiment, except for the changes noted herein and the changes that would be understood by one reasonably skilled in the art in light of this disclosure.

The optics assembly of the second alternate embodiment does not include the mirror assembly 68c (FIGS. 3–4), and the path angle 60' defined between the travel paths 56'a, b has been decreased to approximately ninety degrees so that the mirrors 44a, b are concentrically arranged about the central point 58. The optical path length 30' includes a first segment 126 extending between the mirror 44a and, for example, a package 20 (FIG. 1). The optical path 30' further includes a second segment 128 defined between the mirror 44a and the mirror 44b, and a third segment 130 defined between the mirror 44b and, for example, the detector 40 (FIG. 1). The mirrors 44a, b are arranged so that the separation distances 66'a, b remain equal, the reflection angles 65' are approximately forty-five degrees, and the orientation angles 64' are approximately 112.5 degrees. While the second alternate embodiment preferably functions to equalize the length of the optical path 30', it can also be described in the context of changing the length of the optical path 30'. The change in the length of the optical path 30' is equal to approximately 3.4142 times the change in the separation distances 66'a–b.

In accordance with other alternate embodiments that operate under the same general principals as those disclosed above, the present invention contains more than three concentrically mounted mirrors. Those mirrors cooperate to at least partially define an optical path defined with respect to packages. Those mirrors are contemporaneously moved toward and away from a central point to adjust the optical path so that the length of the optical path is equalized for packages of varying heights.

The present invention has been described in relation to particular embodiments which are intended in all respects to be illustrative rather than restrictive. For example, it is not necessary for the optics assembly 42 and other components of the camera system 10 to be above a conveyor belt 14. For example, the camera system 10 can be beside a conveyor belt 14 for reading labels 18 on vertical sides of packages 20 that are at different distances from the camera system 10. Thus, it is not necessary for the first segment 32 of the optical path 30 to be vertical. Other alternative embodiments will become apparent to those skilled in the art to which the present invention pertains without departing from the its spirit and scope. Accordingly, the scope of the present invention is defined by the appended claims rather than the foregoing description.

We claim:

1. An optical system for equalizing a length of an optical path, said optical path having a first path end at a detector and a second path end at an object, comprising:

a frame member, and a plurality of movable mirrors movably mounted to said frame member and cooperating to at least partially define said optical path, said mirrors being operative for radial movement relative to a central point to equalize the length of said optical path in response to movement of said second path end from a first position to a second position, wherein said radial movement of each of said mirrors is translational relative to each of the other of said mirrors.

2. The apparatus of claim 1, wherein said first position is closer to said optical system than said second position, and wherein said optical system further comprises moving means for contemporaneously moving said mirrors toward said central point to equalize the length of said optical path when said second path end is moved from said first position to said second position, and contemporaneously moving said mirrors away from said central point to equalize the length of said optical path when said second path end is moved from said second position to said first position.

3. The apparatus of claim 1, wherein said optical path includes a plurality of segments, wherein at least one intersection is defined between segments of said plurality of segments, said intersection being distant from each of said mirrors, and wherein a final segment of said plurality of segments extends from the object and defines an axis, said second path end being movable along said axis.

4. The apparatus of claim 1, wherein each of said mirrors is movable along a separate straight path, whereby a plurality of straight paths are defined, and wherein said paths of said plurality of straight paths are non-parallel.

5. The apparatus of claim 1, wherein said plurality of movable mirrors includes at least three movable mirrors.

6. The apparatus of claim 1, wherein each of said mirrors is generally equidistant from said central point, and wherein each of said mirrors includes a reflective surface that is oriented generally toward said central point.

7. The apparatus of claim 1, further comprising:

a motor; and a plurality of belts that are driven by said motor, wherein each of said mirrors is connected to and travels with a segment of a belt of said plurality of belts.

8. The apparatus of claim 1, further comprising:

a plurality of carriages, wherein each of said mirrors is mounted to a carriage of said plurality of carriages; and a plurality of tracks mounted to said frame member, wherein each carriage of said plurality of carriages movably associated with a track of said plurality of tracks.

9. The apparatus of claim 1, wherein the object is a label on a package being conveyed by a conveyor.

10. The apparatus of claim 9, further comprising:

a height sensor for measuring a distance relating to the height of the object; and a processor responsive to said height sensor to adjust the positions of said mirrors to equalize the length of said optical path.

11. An optical system for equalizing a length of an optical path, said optical path having a first path end at a detector and a second path end at an object, comprising:

a frame member, and a plurality of movable mirrors movably mounted to said frame member and cooperating to at least partially define said optical path, said mirrors being operative for radial movement relative to a central point to equalize the length of said optical path in response to movement of said second path end from a first position to a second position, wherein each of said mirrors is movable along a different travel path, said travel paths are non-parallel and each of said travel paths defines an elongate distance.

12. The apparatus of claim 11, wherein said optical path includes a plurality of segments and at least one intersection is defined between segments of said plurality of segments, said intersection being distant from each of said mirrors.

13. The apparatus of claim 11, wherein said movement of each of said mirrors is translational relative to each of the other of said mirrors.

14. The apparatus of claim 11, wherein an angle of approximately ninety degrees is defined between travel paths of said plurality of travel paths.

15. The apparatus of claim 11, wherein said travel paths are oblique.

16. The apparatus of claim 15, wherein an angle of approximately one hundred and twenty degrees is defined between travel paths of said plurality of travel paths.

17. The apparatus of claim 11, wherein the object is a label on a package being conveyed by a conveyor, and wherein said optical system further comprises a height sensor for measuring a distance relating to the height of the object, and a processor responsive to said height sensor to adjust the positions of said mirrors to equalize the length of said optical path.

18. The apparatus of claim 11, wherein each of said mirrors is generally equidistant from said central point, and wherein each of said mirrors includes a reflective surface that is oriented generally toward said central point.

19. The apparatus of claim 11, wherein said first position is closer to said optical system than said second position, and wherein said optical system further comprises moving means for contemporaneously moving said mirrors toward a central point to equalize the length of said optical path when said second path end is moved from said first position to said second position, and contemporaneously moving said mirrors away from said central point to equalize the length of said optical path when said second path end is moved from said second position to said first position.

20. The apparatus of claim 11, wherein said optical path includes a plurality of segments, and a final segment of said plurality of segments extends from the object and defines an axis, said second path end being movable along said axis.

21. The apparatus of claim 11, wherein said plurality of movable mirrors comprises at least three movable mirrors.

22. An optical system for equalizing a length of an optical path, said optical path having a first path end at a detector and a second path end at an object, comprising:

a frame member, and a plurality of movable mirrors movably mounted to said frame member and cooperating to at least partially define said optical path, said optical path including a plurality of segments and said mirrors being configured to move such that at least one intersection is defined between segments of said plurality of segments, said intersection being distant from each of said mirrors, and said mirrors being configured to move such that a final segment of said plurality of segments extends from the object and defines an axis along which one of said mirrors travels.

23. The apparatus of claim 22, wherein at least two intersections are defined between segments of said plurality of segments, wherein each intersection of said two intersections is distant from each of said mirrors.

24. The apparatus of claim 22, wherein at least three intersections are defined between segments of said plurality of segments, wherein each intersection of said three intersections is distant from each of said mirrors.

25. The apparatus of claim 22, wherein said first position is closer to said optical system than said second position, and wherein said optical system further comprises moving means for contemporaneously moving said mirrors toward a central point to equalize the length of said optical path when said second path end is moved from said first position to said second position, and contemporaneously moving said mirrors away from said central point to equalize the length of said optical path when said second path end is moved from said second position to said first position.

26. The apparatus of claim 22, wherein the object is a label on a package being conveyed by a conveyer.

27. The apparatus of claim 26, wherein a first segment of said plurality of segments is defined between the object and a first of said mirrors, wherein a second segment of said plurality of segments is defined between the detector and a second of said mirrors, and wherein said first segment intersects said second segment.

28. The apparatus of claim 26, further comprising:
a height sensor for measuring a distance relating to the height of the object; and
a processor responsive to said height sensor to adjust the positions of said mirrors to equalize the length of said optical path in response to movement of said second path end from a first position to a second position.

29. An optical system for equalizing a length of an optical path, said optical path having a first path end at a detector and a second path end at an object, comprising:
a frame member, and
a plurality of movable mirrors movably mounted to said frame member and cooperating to at least partially define said optical path, said mirrors being contemporaneously movable radially toward and away from a central point along travel paths having lengths to equalize the length of said optical path in response to movement of said second path end from a first position to a second position.

30. The apparatus of claim 29,
wherein said first position is closer to said optical system than said second position, and
wherein said optical system further comprises moving means for
contemporaneously moving said mirrors toward said central point to equalize the length of said optical path when said second path end is moved from said first position to said second position, and
contemporaneously moving said mirrors away from said central point to equalize the length of said optical path when said second path end is moved from said second position to said first position.

31. The apparatus of claim 29, wherein said mirrors at least partially encircle said central point.

32. The apparatus of claim 29,
wherein each of said mirrors is generally equidistant from said central point, and
wherein each of said mirrors includes a reflective surface that is oriented generally toward said central point.

33. The apparatus of claim 29,
wherein the object is a label on a package being conveyed by a conveyor, and
wherein said optical system further comprises
a height sensor for measuring a distance relating to the height of the object, and
a processor responsive to said height sensor to adjust the positions of said mirrors to equalize the length of said optical path.

34. The apparatus of claim 29, wherein said optical path includes a plurality of segments, and a final segment of said plurality of segments extends from the object and defines an axis, said second path end being movable along said axis.

35. The apparatus of claim 29, wherein said plurality of movable mirrors comprises at least three movable mirrors.

36. An optical path modifier, comprising:
a frame member, and
a plurality of movable mirrors mounted to said frame member for movement along a corresponding plurality of travel paths having lengths and extending radially relative to a central point, said mirrors cooperating to at least partially define an optical path, said mirrors also being configured for contemporaneous movement along said travel paths toward said central point to decrease a length of said optical path, and said mirrors also being configured for contemporaneous movement along said travel paths away from said central point to increase the length of said optical path.

37. The apparatus of claim 36, further comprising means for contemporaneously moving said mirrors toward said central point to decrease the length of said optical path, and contemporaneously moving said mirrors away from said central point to increase the length of said optical path.

38. The apparatus of claim 36, wherein said mirrors at least partially encircle said central point.

39. The apparatus of claim 36,
wherein each of said mirrors is generally equidistant from said central point, and
wherein each of said mirrors includes a reflective surface that is oriented generally toward said central point.

40. The apparatus of claim 36,
wherein said optical path is defined between a detector disposed above a conveyor and an object on the conveyer,
wherein the object is a label on a package, and
wherein said optical path equalizer further comprises
a height sensor for measuring a distance relating to the height of the object, and
a processor responsive to said height sensor to adjust the positions of said mirrors and thereby the length of said optical path.

41. The apparatus of claim 36, wherein said plurality of movable mirrors comprises at least three movable mirrors.

42. An optical system for equalizing a length of an optical path, said optical path having a first path end at a detector and a second path end at an object, comprising:
a frame member, and
at least three movable mirrors movably mounted to said frame member and cooperating to at least partially define said optical path, each of said mirrors being operative for translational movement relative to each of the other of said mirrors to equalize the length of said optical path in response to movement of said second path end from a first position to a second position.

43. The apparatus of claim 42,
wherein said optical path includes a plurality of segments, wherein at least one intersection is defined between segments of said plurality of segments, said intersection being distant from each of said mirrors, and
wherein a final segment of said plurality of segments extends from the object and defines an axis, said second path end being movable along said axis.

44. The apparatus of claim 42, wherein each of said mirrors is movable along a separate straight path, whereby a plurality of straight paths are defined, and wherein said paths of said plurality of straight paths are non-parallel.

45. An optical system for equalizing a length of an optical path, said optical path having a first path end at a detector and a second path end at an object, comprising:
a frame member, and
at least three movable mirrors movably mounted to said frame member and cooperating to at least partially define said optical path, wherein each of said mirrors is movable along a different travel path to equalize the length of said optical path in response to movement of said second path end from a first position to a second position, each of said travel paths defines an elongate distance, and said travel paths are non-parallel.

46. The apparatus of claim 45, wherein each of said mirrors is translational relative to each of the other of said mirrors.

47. An optical path modifier, comprising:

a frame member, and at least three movable mirrors mounted to said frame member for movement along a corresponding plurality of travel paths having lengths, said mirrors cooperating to at least partially define an optical path, said mirrors also being configured for movement along said travel paths toward a central point to decrease a length of said optical path, and said mirrors also being configured for movement along said travel paths away from said central point to increase the length of said optical path.

48. The apparatus of claim 47, wherein said movement of each of said mirrors is translational relative to each of the other of said mirrors.

* * * * *